US008055921B2

United States Patent
Bhogal et al.

(10) Patent No.: US 8,055,921 B2
(45) Date of Patent: Nov. 8, 2011

(54) LOW POWER DATA TRANSFER MODE FOR BATTERY POWERED PERSONAL COMPUTING DEVICES

(75) Inventors: Kulvir S. Bhogal, Pfugerville, TX (US); Gregory J. Boss, American Fork, UT (US); Rick A. Hamilton, II, Charlottesville, VA (US); Robert R. Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 12/130,985

(22) Filed: May 30, 2008

(65) Prior Publication Data
US 2009/0063839 A1    Mar. 5, 2009

Related U.S. Application Data

(63) Continuation-in-part of application No. 11/847,456, filed on Aug. 30, 2007.

(51) Int. Cl.
G06F 1/26  (2006.01)
G06F 1/32  (2006.01)
(52) U.S. Cl. ...................................................... 713/320
(58) Field of Classification Search ................... 713/320
See application file for complete search history.

(56) References Cited

U.S. PATENT DOCUMENTS

| 6,631,469 | B1 | 10/2003 | Silvester |
| 7,184,003 | B2* | 2/2007 | Cupps et al. ................... 345/30 |
| 2002/0023237 | A1 | 2/2002 | Yamada et al. |
| 2004/0162922 | A1 | 8/2004 | Kardach et al. |
| 2006/0129861 | A1* | 6/2006 | Kee et al. ....................... 713/323 |
| 2008/0244289 | A1* | 10/2008 | LeProwse et al. ............ 713/320 |

FOREIGN PATENT DOCUMENTS

WO    2007035611 A2    3/2007

* cited by examiner

*Primary Examiner* — Mohammed Rehman
(74) *Attorney, Agent, or Firm* — Steven M. Greenberg, Esq.; Carey, Rodriquez, Greenberg & Paul

(57) ABSTRACT

Embodiments of the present invention provide a method, system and computer program product for a low power data transfer mode for mobile computing devices. In an embodiment of the invention, a method for low power data transfer in a battery powered computing device can be provided. The method can include powering up a battery powered computing device, booting into a primary personal computing operating system in the device and storing a document into fixed storage for the device, and subsequently re-booting into an auxiliary low-power consumption operating system in the device, establishing a short range radio frequency communications link between the battery powered computing device and an external pervasive device, and transmitting the stored document to the pervasive device over the short range radio frequency communications link.

5 Claims, 1 Drawing Sheet

US 8,055,921 B2

LOW POWER DATA TRANSFER MODE FOR BATTERY POWERED PERSONAL COMPUTING DEVICES

CROSS-REFERENCE TO RELATED APPLICATIONS

This patent application claims the benefit under 35 U.S.C. §120 as a continuation-in-part of presently pending U.S. patent application Ser. No. 11/847,456, entitled DOCUMENT VIEWING MODE FOR BATTERY POWERED COMPUTING DEVICES, filed on Aug. 30, 2007, the entire teachings of which are incorporated herein by reference.

BACKGROUND OF THE INVENTION

1. Field of the Invention

The present invention relates to the field of battery powered personal computing devices including notebook style personal computers, and more particularly to the field of document editing within a battery powered personal computing device.

2. Description of the Related Art

Personal computing has advanced over time beginning with the dawn of personal computing more than thirty years ago. Initially envisioned as a plaything for the home hobbyist, the personal computer quickly evolved into a significant business tool. Within a short period of time from the introduction of the first turn-key functional personal computer, computer manufacturers recognized the need for a portable form of the personal computer. Consequently, the clam shell design provided initial portability for the personal computer, soon thereafter followed by the semi-portable casing of the Apple(™) (Macintosh™).

Despite the portable nature of the clam shell design, an AC power source still powered portable forms of the personal computer. Thus, the mobility of the computing end user remained limited to the six feet from AC outlet to personal computer. Nearly a half decade later, however, battery powered personal computers became a reality with the first laptop computer. Battery powered laptop computers liberated the personal computer from the office desk and enabled a mobile workforce that today has transformed the way in which people compute. Battery powered laptop computers literally allow the office to travel with the office worker rather than requiring the office worker to travel to the office.

Battery life has been and will always be the fundamental limitation of the battery powered portable computer. Advances in battery cell technology have lengthened the ability of one to computer by battery from merely an hour to nearly a day. Yet, the mobile computing workforce still faces on a constant basis the nearly exhausted charge of the notebook computer battery. To maximize mobile usage of the notebook computer, automated power management techniques have evolved that generally include the strategic management of display backlighting, hard drive powering and the reduction in central processing unit (CPU) speed.

Even still, most computing end users can attest to the moment when, despite best efforts at power management, they are notified of the impending exhaustion of battery life— oftentimes at a critical time when computing is of paramount importance. Mobile computing can be especially important for end users seeking to read electronic materials while lacking access to a hard copy of the same materials. In this circumstance, the notebook computer essentially transforms into an electronic book or magazine providing a view into an electronic document. When utilized as a document viewer, very few resources need be consumed by the notebook computer. Notwithstanding, no matter whether one uses a notebook computer to perform processor intensive computing or merely to view a document, without power the notebook computer becomes unusable.

BRIEF SUMMARY OF THE INVENTION

Embodiments of the present invention address deficiencies of the art in respect to power consumption in a battery powered personal computer and provide a novel and non-obvious method, system and computer program product for a low power data transfer mode for mobile computing devices. In an embodiment of the invention, a battery powered computing device configured for low power data transfer can include a central processing unit (CPU), both coupled to a battery, memory, fixed storage and a display within a single computing case. The device also can include a primary personal computing operating system and also an auxiliary low-power consumption operating system each stored in fixed storage, each including a configuration to access an editable document in the fixed storage.

The device yet further can include a short range radio frequency transceiver configured for access by the auxiliary low-power consumption operating system to establish a short range radio frequency communications link with an external pervasive device and to transmit the editable document to the pervasive device. Finally, the device can include a boot read only memory (ROM) programmed to selectively bootstrap into either the primary personal computing operating system or the auxiliary low-power consumption operating system. In one aspect of the embodiment, a microcontroller can be configured for use by the auxiliary low-power consumption operating system when bootstrapping the auxiliary low-power consumption operating system in the boot ROM. In another aspect of the embodiment, the CPU is unpowered when the microcontroller is powered.

In another embodiment of the invention, a method for low power data transfer in a battery powered computing device can be provided. The method can include powering up a battery powered computing device, booting into a primary personal computing operating system in the device and storing a document into fixed storage for the device, and subsequently re-booting into an auxiliary low-power consumption operating system in the device, establishing a short range radio frequency communications link between the battery powered computing device and an external pervasive device, and transmitting the stored document to the pervasive device over the short range radio frequency communications link.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for low power data transfer in a battery powered computing device. In accordance with an embodiment of the present invention, a battery powered computing device can be provided, including a battery power source, keyboard, CPU, memory, mass storage device and display supporting the operation of a primary full power consumptive operating system such as the WINDOWS operating system (manufactured by Microsoft Corporation of Redmond, Wash.).

A microcontroller can be incorporated into the battery powered computing device, powered by the battery power source and coupled to static memory and also a short range radio frequency transceiver, for example a BLUETOOTH™ type transceiver. The microcontroller can host the operation of a low-power consumption operating system such as an operating system tailored for a personal digital assistant (PDA). Examples include the SYMBIAN OS (Manufactured by Symbian Ltd. of Southwark, United Kingdom), Windows Mobile(™) (Manufactured by Microsoft Corporation of Redmond, Wash.) and the GARNET OS (Manufactured by Palm, Inc. of Sunnyvale, Calif.).

The battery powered computing device can be configured to operate as a normal personal computer operating mode utilizing the full power consumptive primary operating system, or in a low power data transfer mode utilizing the low-power consumption operating system. In the former circumstance, the battery powered personal computer can operate as a personal computer and all respective devices can operate in a selected power management mode. In the latter circumstance, however, a low power consumption auxiliary operating system can operate through the microcontroller in lieu of the full power consumptive primary operating system to provide access to documents in shared memory or storage through a short range radio frequency communications link established between the battery powered computing device and an external pervasive device.

Figure 1:
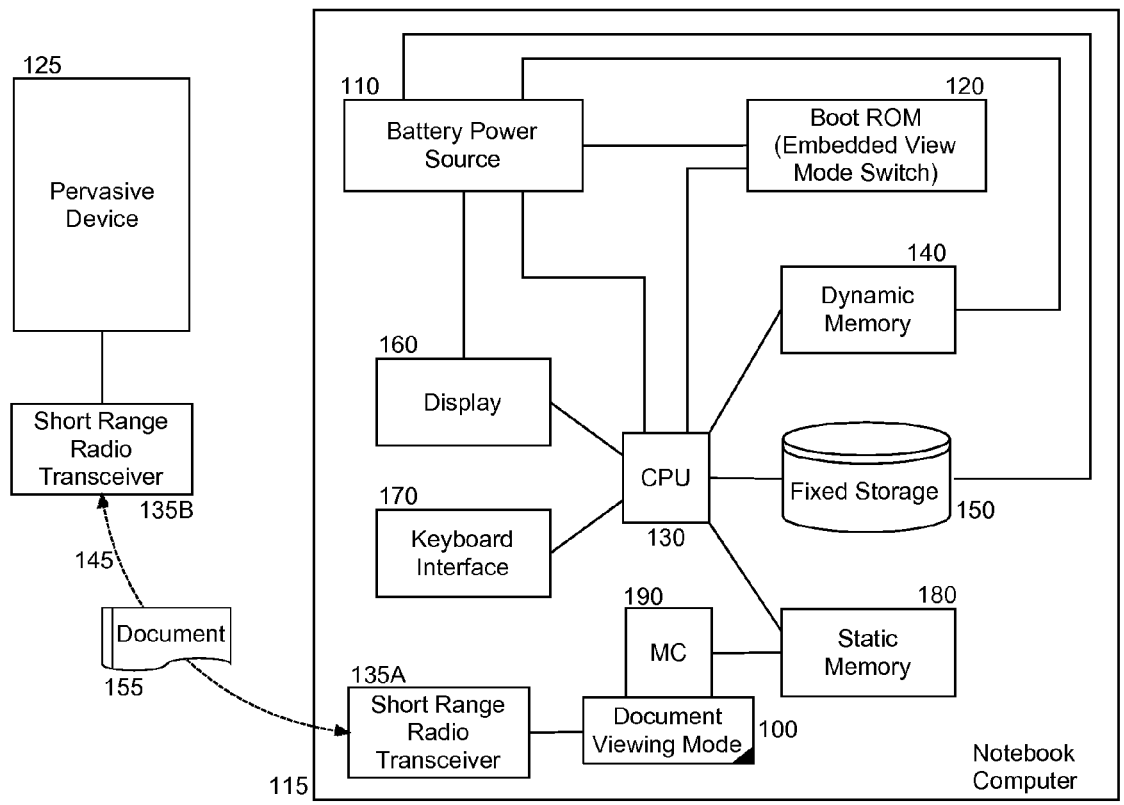
FIG. 1 is a schematic illustration of a battery powered computing device configured for a low power data transfer mode; and, FIG. 2 is a flow chart illustrating a process for low power data transfer in a battery powered computing device.

In this way, a computing end user can edit a document within the battery powered computing device using the power utilization efficiency of the pervasive device without requiring the power consumptive operation of the full power consumptive primary operating system of the personal computer. In illustration, FIG. 1 is a schematic illustration of a battery powered computing device configured for a low power data transfer mode. The battery powered computing device can include a CPU 130 powered by a battery power source 110. The battery powered computing device also can include a display 160 onto which data can be presented by the CPU 130, and a keyboard interface 170 through which data input can be received from an input device such as a keyboard or keypad. The CPU 130 can be coupled to dynamic memory 140 and fixed storage 150 so as to provide short term memory and long term memory for use by application logic executing in the CPU 130. Finally, a boot read only memory (ROM) 120 can be provided to manage bootstrap for the battery powered computing device.

A microcontroller 190 can be provided in addition to the CPU 130. The microcontroller 190 can be coupled to static memory 180 such as a flash memory. The static memory 180 in turn can be coupled to the CPU 130 such that both the microcontroller 190 and the CPU 130 can access the content of the static memory 180. As such, the boot ROM 120 can include logic enabled to select a computing mode by initiating bootstrap through the CPU 130 which excludes the microcontroller 190, or to select a low power data transfer mode by initiating bootstrap through the microcontroller 190 to the exclusion of the CPU 130.

The CPU 130 can support the execution of an application enabled to save a document into fixed storage 150. Also, the CPU 130 can support the execution of an application enabled to save a document into the static memory 180. The microcontroller 190, in turn, can include embedded program code 100 enabled upon bootstrap to establish a short range radio frequency communications link 145 between short range radio transceiver 135A and complimentary short range radio transceiver 135B in pervasive device 125, for example a cellular telephone or personal digital assistant. Additionally, the embedded program code 100 can be enabled to access the static memory 180 to retrieve an electronic document 155 disposed therein. Finally, the embedded program code 100 of the microcontroller 190 can be enabled to transmit the retrieved electronic document 155 to the pervasive device for editing over the short range radio frequency communications link 145.

Figure 2:
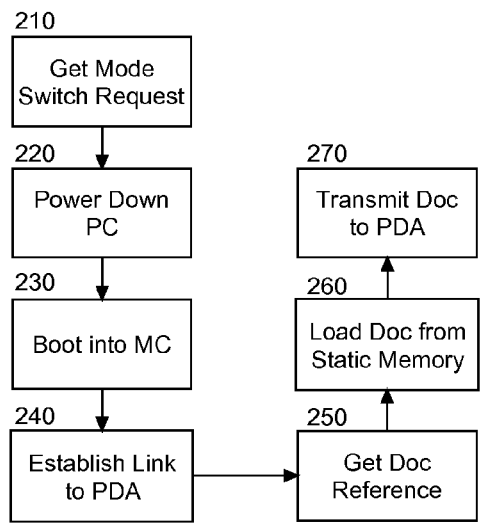

In further illustration, FIG. 2 is a flow chart illustrating a process for power optimized use of a battery powered computing device for document editing. The process can begin in block 210. In block 210 a mode switch request can be received to switch from a full power mode to a low power data transfer mode and in block 220, the battery powered computing device can be powered down for reboot into a low power data transfer mode through the microcontroller in block 230. In block 240, a short range radio frequency communications link, such as the BLUETOOTH type can be established between the battery powered computing device and an external, pervasive device.

Thereafter, in block 250 a reference to a specific document can be received and in block 260 the specific document can be loaded from static memory in the battery powered computing device. Finally, in block 270 a selected document can be transmitted from the battery powered computing device to the pervasive device over the short range radio frequency communications link so that the document can be edited within the battery powered computing device.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A battery powered computing device configured for low power data transfer, the computing device comprising:
   a central processing unit (CPU) coupled to a battery, dynamic memory, fixed storage and a display within a single computing case, the CPU also being coupled to a static memory;
   a primary personal computing operating mode enabled by application logic stored in the fixed storage for enabling the CPU to save an editable document into the static memory and also an auxiliary low-power consumption operating mode enabled by embedded program code embedded in a microcontroller separate from the CPU, the microcontroller being coupled to the static memory for accessing and retrieving the editable document from the static memory;
   a short range radio frequency transceiver configured for access by the auxiliary low-power consumption operating mode to establish a short range radio frequency communications link with an external pervasive device and to transmit the editable document from the static memory to the pervasive device; and,
   a boot read only memory (ROM) programmed to selectively bootstrap into either the primary personal computing operating mode or the auxiliary low-power consumption operating mode.

2. The device of claim 1, wherein the microcontroller is configured for use by an auxiliary low-power consumption operating system when bootstrapping the auxiliary low-power consumption operating system in the boot ROM.

3. The battery powered computing device of claim 2, wherein the CPU is unpowered when the microcontroller is powered.

4. A method for low power data transfer in a battery powered computing device, the method comprising:
   powering up a battery powered computing device;
   booting into a primary personal computing operating mode in the device utilizing a central processing unit (CPU) and storing an editable document into a static memory; and,
   subsequently re-booting into an auxiliary low-power consumption operating mode enabled by embedded program code embedded in a microcontroller separate from the CPU for accessing and retrieving the editable document from the static memory, establishing a short range radio frequency communications link between the battery powered computing device and an external pervasive device, and transmitting the editable document from the static memory to the pervasive device over the short range radio frequency communications link.

5. A computer program product comprising a computer usable storage medium embodying computer usable program code for low power data transfer in a battery powered computing device, the computer program product comprising:
   computer usable program code for powering up a battery powered computing device;
   computer usable program code for booting into a primary personal computing operating mode in the device utilizing a central processing unit (CPU) and storing an editable document into a static memory; and,
   computer usable program code for subsequently re-booting into an auxiliary low-power consumption operating mode enabled by embedded program code embedded in a microcontroller separate from the CPU for accessing and retrieving the editable document from the static memory, establishing a short range radio frequency communications link between the battery powered computing device and an external pervasive device, and transmitting the editable document from the static memory to the pervasive device over the short range radio frequency communications link.

* * * * *